M. TRIMBLE.
Feeder for Corn Shellers.
No. 31,839.  Patented March 26, 1861.
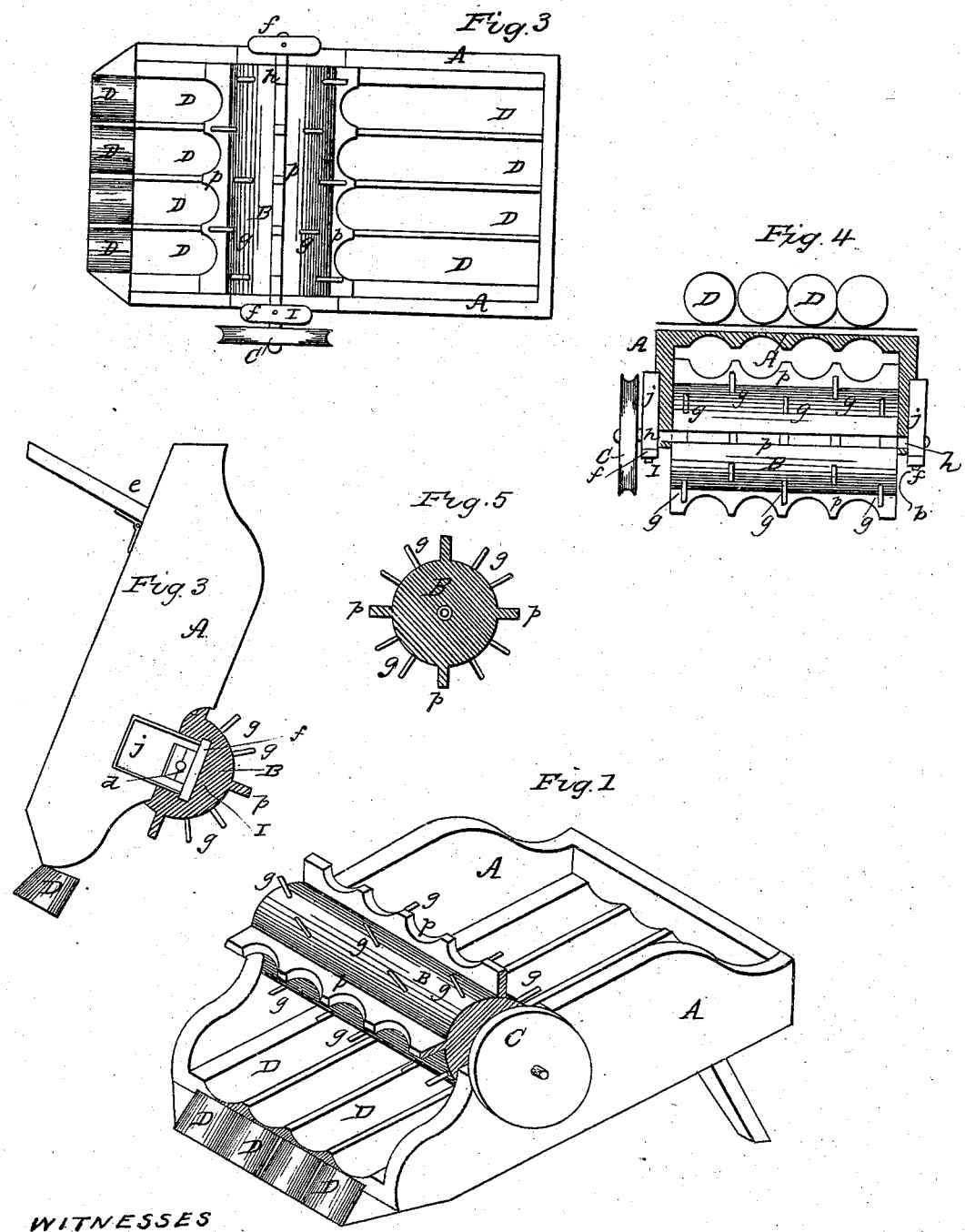

UNITED STATES PATENT OFFICE.

MATHEW TRIMBLE, OF PRINCETON, ILLINOIS.

CORN-SHELLER.

Specification of Letters Patent No. 31,839, dated March 26, 1861.

*To all whom it may concern:*

Be it known that I, MATHEW TRIMBLE, of Princeton, in the county of Bureau and State of Illinois, have invented a new and useful Improvement in Corn-Shellers; and I do hereby declare that the following is a full and exact description thereof, reference being had to the accompanying drawings, making a part of this specification, in which—

Figure 1 represents a perspective view. Fig. 2 represents a side view. Fig. 3 represents a top view. Fig. 4 represents a cylinder. Fig. 5 represents end of cylinder.

Letter A, hopper; B, cylinder; C, pulley; D, D, troughs; E, standard; $g$, $g$, spikes in cylinder B; $h$, shaft; I, set-screw; P, P, coves on cylinder B; bearers, $j$, $j$; boxes, $d$, $d$; caps, $f$, $f$.

The nature of my invention consists in a novel arrangement of means for feeding the ears of corn to the sheller, as hereinafter fully described.

To enable others skilled in the art to make and use my invention, I will proceed to describe its construction and operation:

I construct hopper A of wood, to which cylinder B is attached upon the top part. Pulley C is fastened on the end of shaft running from cylinder B. Troughs D, D, run the whole length of hopper A, and are covered at the lower end to guide the corn into the sheller. Standard $e$, to hold up the back part of hopper A. Spikes $g$, $g$, are fastened in rows around cylinder B, and correspond with edges of troughs D, D. Shaft $h$ passes through cylinder B. Set-screw I is placed over shaft $h$. Coves P, P, are attached to cylinder B; edges of coves correspond with edges of troughs D, D. Bearers $j$, $j$, to sustain shaft $h$, are fastened on hopper A. Boxes $d$, $d$, are placed in bearers $j$, $j$. Caps $f$, $f$, are placed over boxes $d$, $d$. The cylinder is hung on the top part of the hopper, and has spikes fastened in rows around it to correspond with the edges of troughs. The coves on the cylinder are made to correspond with the troughs. The shaft of the cylinder has a pulley fastened on one end to which a belt is attached, and to the corn sheller, which causes the cylinder to move up with sufficient velocity to bring the spikes around in time to keep the ears of corn straight in the troughs, and the coves coming around at the same time keep the corn back, so that but one ear of corn can pass through at a time in each trough.

I do not claim broadly the hopper and cylinder, as they have been previously known and used.

What I claim as my invention, and desire to secure by Letters Patent, is—

The arrangement of hopper A, in combination with cylinder B, pulley C, troughs D, D, standard $e$, spikes $g$, $g$, shaft $h$, coves P, P, bearers $j$, $j$, boxes $d$, $d$, caps $f$, $f$, substantially as shown and described.

MATHEW TRIMBLE.

Witnesses:
CAIRO D. TRIMBLE,
CARNOT C. MASON.